United States Patent [19]

Hill

[11] 4,067,520

[45] Jan. 10, 1978

[54] METHOD AND APPARATUS FOR TERRAIN AVOIDANCE

[75] Inventor: Maynard L. Hill, Silver Springs, Md.

[73] Assignee: The United States of America as represented by the Secretary of the Navy, Washington, D.C.

[21] Appl. No.: 726,319

[22] Filed: Sept. 24, 1976

[51] Int. Cl.$^2$ .............................................. G05D 1/10
[52] U.S. Cl. ..................................... 244/177; 324/32; 324/72; 340/27 AT
[58] Field of Search ...................... 244/76 R, 171, 177, 244/180; 250/336, 374; 318/584–585; 324/8, 32, 72; 340/27 AT

[56] References Cited

U.S. PATENT DOCUMENTS

| | | | |
|---|---|---|---|
| 2,454,630 | 11/1948 | Buckthal | 324/72 |
| 3,525,866 | 8/1970 | Sagalyn et al. | 244/171 X |
| 3,868,074 | 2/1975 | Hill | 244/177 |

FOREIGN PATENT DOCUMENTS 2,278,058  2/1976  France ................................ 244/177

Primary Examiner—Stephen G. Kunin
Attorney, Agent, or Firm—R. S. Sciascia; A. L. Branning

[57] ABSTRACT

A method and apparatus for utilizing the earth's static electric field to detect and/or avoid orographic protrusions extending from the earth's surface, the invention particularly allows detection of electrostatic field disturbances caused by typical mountain contours at horizontal distances up to five times the height of the mountain contour causing the disturbances. The present method comprises measurement of the horizontal component of the static electric field existing in the earth's atmosphere, the attitude of the platform from which such measurement is taken being essentially held parallel to an "artificial horizon". Orographic protrusions, or terrain obstacles, can thus be detected by an increase in the measured value of the horizontal component of the atmospheric static electric field.

11 Claims, 6 Drawing Figures

METHOD AND APPARATUS FOR TERRAIN AVOIDANCE

BACKGROUND AND SUMMARY OF THE INVENTION

Although electrical phenomena in the earth's atmosphere have been studied since the eighteenth century, the realization of the existence of a static field having a vertical potential gradient only occurred approximately fifty years ago. This static electric field was determined to exhibit a change in potential which decreases with increasing altitude. At an altitude of approximately 50 kilometers, the atmosphere effectively acts as a perfect conductor. This conducting layer of the atmosphere (known as the electrosphere) together with the earth forms a spherical condenser, the potential of the electrosphere is about 300,000 volts positive relative to the earth (which is conventionally taken to have a potential of zero). Therefore, the electric field which exists in the atmosphere would be considered to be negative (i.e., "pointed" toward the earth) according to "natural" co-ordinate systems. However, this field is usually denoted as "positive" in the study of atmosphere electricity. This sign confusion can be avoided by referring to the atmospheric electric field as the "potential gradient", the graident thus being conventionally "positive" for normal atmospheric conditions.

Hill, in U.S. Pat. No. 3,868,074 inter alia, showed that the static electric field in the atmosphere could be utilized to obtain a reference signal which would be employed inter alia to control both pitch and roll axes stabilization of airborne vehicles. In a more general sense, Hill showed that lines and planes of equipotential existed in the atmosphere, these lines and planes being generally parallel to the surface of the earth absent any disturbing conditions. Hill further provided methods and means for defining such equipotential lines and planes, the lines and planes so defined being useful as a reference for aircraft stabilization and gyroscopic drift correction inter alia.

The present invention provides further definition of the utility of this static electric field existing in the atmosphere. In particular, the invention provides a method and apparatus for detecting and utilizing spatial disturbances in the atmosphere electric field, thereby to enable the avoidance of both man-made and natural orographic protrusions extending from the nominal surface of the earth. Since the conductivity of the earth, or of any orographic protrusion extending into the atmosphere therefrom, is so much greater than that of the atmosphere, the boundary condition for the Poissons equation describing the atmospheric potential at the earth's surface and at the surface of any protrusion is a constant conventionally taken as zero. Thus, at the surface of the earth and at the surfaces of natural and man-made protrusions extending from the earth, an equipotential surface or surfaces exist and the atmospheric field in the vicinity thereof is distorted. In a practical sense, lines and planes of equipotential in the vicinity of orographic protrusions are not parallel to the nominal surface of the earth. Therefore, in a practical sense, the present invention hereby provides teachings which enable the detection and utilization of these spatial disturbances for terrain avoidance. Terrain obstacles of both natural and man-made origin, which can be generically classed as orographic protrusions, perturb the electric field to the degree that the normally vertical potential gradient has both a vertical and a horizontal component. The unperturbed electric field always has a vertical component, the horizontal component of the potential gradient being essentially zero.

According to the present invention, an airborne vehicle in flight over terrain from which significant orographic protrusions extend, can avoid such protrusions by detection of perturbations in the potential gradient which are caused by the protrusions. If the vehicle is on a horizontal flight path lying below or near the altitude of the protrusion, perturbations in the potential gradient can be detected which can usually be used to avoid the protrusion. In a situation where a protrusion is essentially vertical, such as a radio tower or the like, the perturbations usually do not extend sufficiently far from the protrusion to allow detection in time for conventional aircraft to avoid a potential collision. Nevertheless, the principles are useful for slow moving vehicles such as helicopters. The perturbations due to the typical "hill" or mountain ridge can be detected at distances of five times the height of the hill or mountain ridge. Orographic protrusions of this type are of primary interest in terrain avoidance, can be avoided by aircraft through measurement of the horizontal component of the perturbed electric field, the horizontal component of the field being seen to increase as the airborne vehicle approaches the protrusion.

The present invention particularly provides a method wherein the atmospheric potential is sensed at two spaced points in the atmosphere on or near an airborne object, such as an airplane, operating in the atmosphere. Subject to disposition of the potential sensing apparatus and corrections for positioning thereof on the airborne object, the measured potentials will be equal if the object maintains a "level" flight attitude according to the teachings of Hill in the aforementioned U.S. Pat. No. 3,868,074. In said patent, the existence of horizontal lines and planes of equipotential parallel to the earth's nominally flat surface is shown, the potentials measured at two points lying effectively in the same plane being equal. However, according to the present teachings, it is seen that orographic protrusions distort the static electric field to cause said field to generally follow the contours of the protrusion. Thus, as long as the horizontal altitude of the airborne object is maintained, a difference in potential measured between two points as aforesaid indicates the existence of a distorted static electric field. Such a distorted electric field, absent weather-related distortions, indicates the presence of an orographic protrusion. Apparatus embodying the invention can be configured to provide an indication of the presence of the protrusion on a meter or the like or can include servomechanical apparatus which automatically causes the airborne object to avoid the protrusion.

The preferred apparatus of the invention comprises potential sensing probes (which probes may be comprised of radioactive material in order to increase the electrical contact thereof with the air) and a differential voltage amplifier. The amplifier receives the sensed potentials from the probes and detects any difference in the sensed potentials to produce a potential difference signal which may be read out on a gauge or utilized to control a servomechanical or other apparatus. The combination of the potential sensing probes and the differential static amplifier is referred to hereinafter as a differential static voltmeter. In combination with an associated device for providing a stable horizontal reference, perturbations or distortions in the static electric field indicative of orographic protrusions can be identified. This associated device can take the form of a vertical reference gyroscope which defines an artificial horizontal reference with which the airborne object can be aligned.

Thus, it is an object of the invention to provide a method and apparatus for avoiding orographic protrusions extending from the earth's surface.

It is another object of the invention to detect potential differences between at least two spaced points on an airborne vehicle flying substantially level relative to an artificial horizontal reference, a detected potential difference indicating the presence and location of an orographic protrusion.

It is a further object of the invention to provide a differential voltmeter in combination with a vertical reference gyroscope for detecting terrain features extending from the earth's surface.

Further objects and advantages will become more readily apparent in light of the following detailed description of the invention.

DESCRIPTION OF THE PREFERRED EMBODIMENTS

The several embodiments of the invention utilize the distorted static electric field which exists in the atmosphere in the vicinity of mountains and other orographic protrusions to generate an information-bearing electrical signal. The generated signal is used for the detection of the presence and/or location of the orographic protrusion. With the information so obtained, an operator of an airborne vehicle can avoid the protrusion by either manual or automatic means or can position the vehicle at a desired attitude with respect to the protrusion. For simplicity, the invention will be described hereinafter essentially as a method and means for terrain avoidance, it being understood that the invention can be practiced otherwise as comprehended from the disclosure as a whole. For further purposes of simplicity, the invention will be illustrated in specific terms as a means for avoiding a "mountain", terrain "upwellings" of this type being the most common terrain features which require avoidance by aircraft operators. Accordingly, it is to be understood that reference hereinafter to the term "mountain" is to be considered synonymous with both natural and man-made orographic protrusion.

Figure 1:
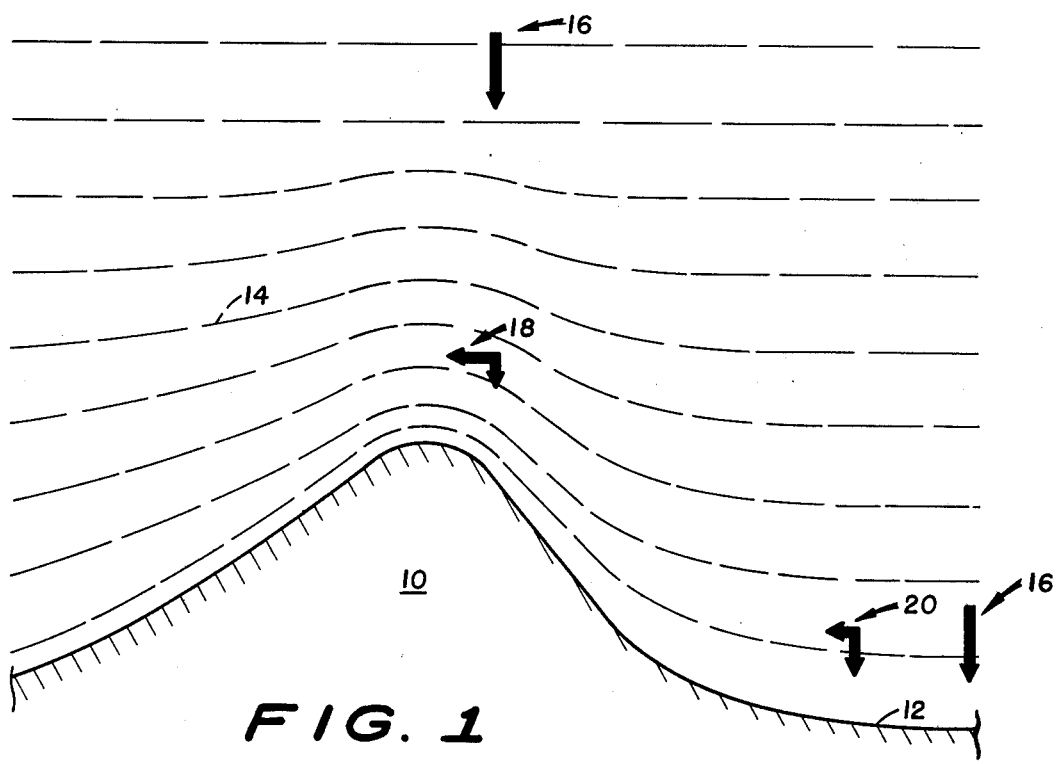
FIG. 1 is an idealized schematic view of the equipotential surfaces in the static electric field in the earth's atmosphere, surrounding a typical terrain upwelling, the vector components of the field being particularly illustrated.

Referring now to FIG. 1, a mountain 10 is seen to rise from surrounding terrain 12 which is essentially "level" or horizontal with respect to a localized norm for the surface of the earth. Phantom lines 14 of equipotential are seen in this essentially sectional view to represent two-dimensional surfaces which extend into and out of the plane of the paper and which conform generally to the geometric contours of the mountain 10. As can be seen in FIG. 1, the lines 14 are essentially "horizontal", i.e., parallel to the nominal surface of the earth, above substantially "flat" terrain and at a certain distance above the mountain 10. At such locations, the lines 14 essentially represent horizontal planes of equipotential which can be utilized as taught in U.S. Pat. No. 3,868,074 inter alia as an artificial horizon for attitude stabilization of aircraft and the like. The static electric field in which these equipotential planes exist can be represented by vertical vectors 16, the field effectively having only a vertical component in the locations where the lines 14 represent equipotential planes. However, near the mountain 10, the lines 14 represent "distorted" equipotential surfaces which are not parallel to the nominal horizon. At such locations, the static electric field has both a vertical and a horizontal component as represented by the vector pairs 18 and 20. If the line 14, i.e., the equipotential surface, has a slope greater than 45° from the horizontal, such as is seen near the vector pair 18, the horizontal component of the vector pair becomes greater in magnitude than the vertical component. As the contours of the mountain 10 slope back into the relatively flat surrounding terrain 12, such as near the vector pair 20, the vertical component of the vector pair becomes once again greater than the horizontal component thereof, the horizontal component essentially disappearing as "level" terrain is again being traversed. Thus, depending on the slope of the lines 14, the static electric field has a varying horizontal vector component which ranges from essentially zero to values greater than the vertical component. This change in the horizontal vector component of the static electric field existing in the earth's atmosphere, which shall be referred to hereinafter as the "horizontal field", allows the procurement of information relative to the position, size, and geometric contours of terrain obstacles such as the mountain 10, which information can be used inter alia according to the invention for avoidance of the obstacles.

Figure 2:
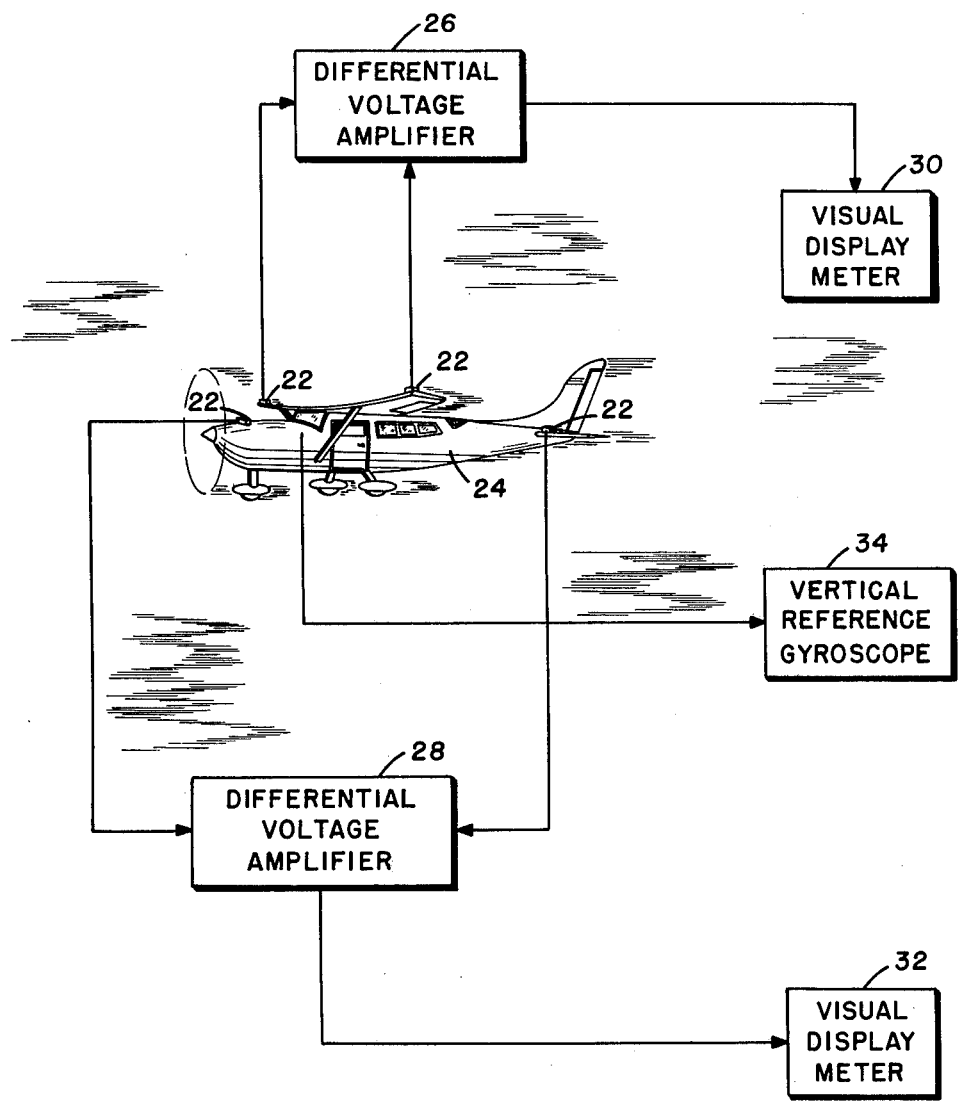
FIG. 2 is a generalized schematic view of one embodiment of the apparatus of the invention.

Generalized apparatus useful in the practice of the present invention can be seen in FIG. 2. Potential sensing probes 22 are mounted on the wingtips and effectively along the longitudinal axis of an aircraft 24. The probes 22 on the wingtips are electrically connected to a first differential voltage amplifier 26 while the probes 22 along the longitudinal axis are connected to a second differential voltage amplifier 28. The probes 22 may comprise metal pads coated with a layer of a radioactive metal or metal salt in order to increase the conductivity of the air in the vicinity of the probes of alpha particle emission (and resulting ionization of the air), thereby to improve the electrical contact of the probes with the air. The probes 22 may alternatively comprise conductive needle-like points, thin pointed metal wires, or other means to accomplish the desired effect of responding rapidly to changes in the static voltage encountered in the atmosphere. The voltage sensed by the probes 22 produces a low impedance input to the differential voltage amplifiers 26 and 28.

The combination of the probes 22 and the amplifier 26 form a "roll" differential static voltmeter which produces an output signal which can be displayed by a visual display meter 30, the meter 30 providing an indication of a difference in the potential sensed between the wingtips of the aircraft 24. Similarly, the probes 27 and the amplifier 28 form a "pitch" differential static voltmeter which produces an output signal which can be displayed by a visual display meter 32 to indicate a difference in the potential sensed along the "pitch" or longitudinal axis of the aircraft. The display meters 30 and 32 are disposed in the cockpit of the aircraft 24 so that the operator of the aircraft can observe readings of the meters which indicate potential differences between the probes 22 of each pair of probes. A vertical reference gyroscope 34 of conventional design is located aboard the aircraft 24 to provide to the operator thereof an indication of the actual attitude of the aircraft relative to an "artificial horizon". Thus, with the information provided to the operator by the display meters 30 and 32 and the gyroscope 34, the operator is able to determine the presence and location relative to the aircraft of a terrain obstacle such as a mountain. From such information, the operator of the aircraft is able to take the actions necessary to avoid the terrain obstacle. It is to be understood that the outputs of the "roll" and "pitch" static voltmeter can be used to drive servomechanical apparatus (not shown in FIG. 2) in a "closed loop" fashion to automatically cause the aircraft 24 to avoid terrain obstacles. Such a system will be described in detail hereinafter, the system shown in FIG. 2 being a more simple "sensor" system which enables an aircraft operator to exercise manual control.

Figure 5:
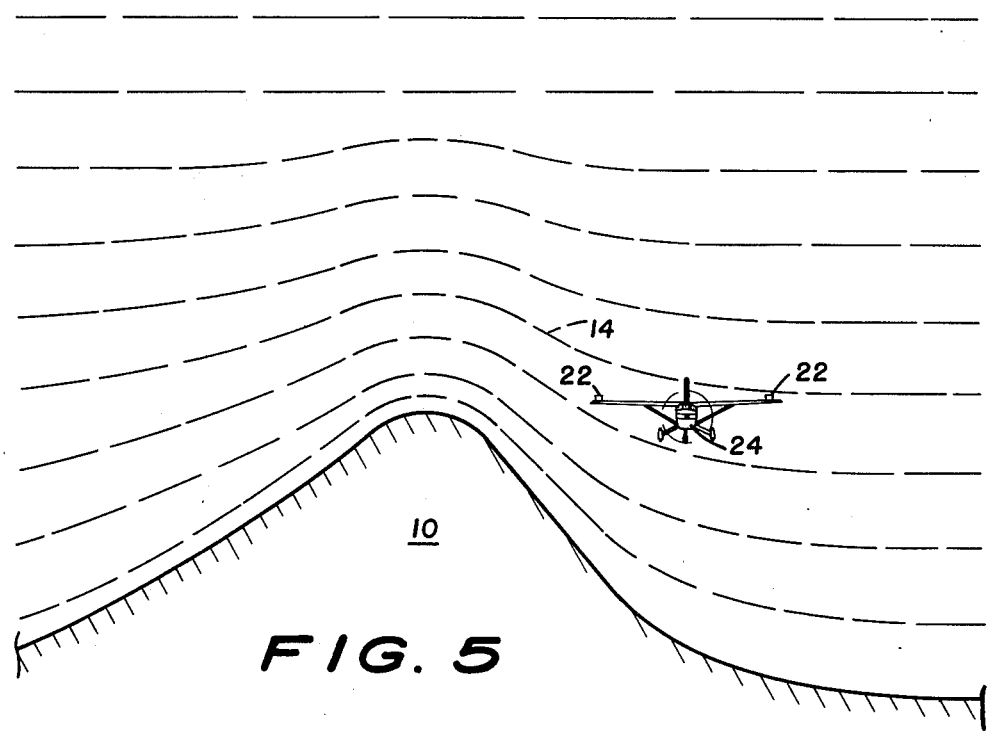
FIG. 5 is a schematic view illustrating the method of the invention relative to the use thereof for airborne objects moving parallel to a mountain; and, FIG. 6 is a schematic view of an aircraft fitted with apparatus embodying automatic terrain avoidance capability.
Figure 4:
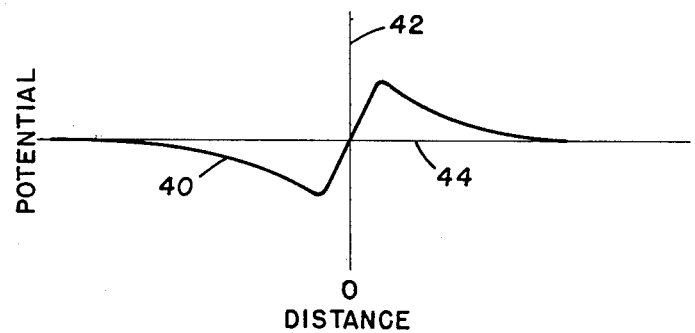
FIG. 4 is a graph illustrating the change in the horizontal component of the static electric field as a terrain obstacle is traversed.
Figure 3:
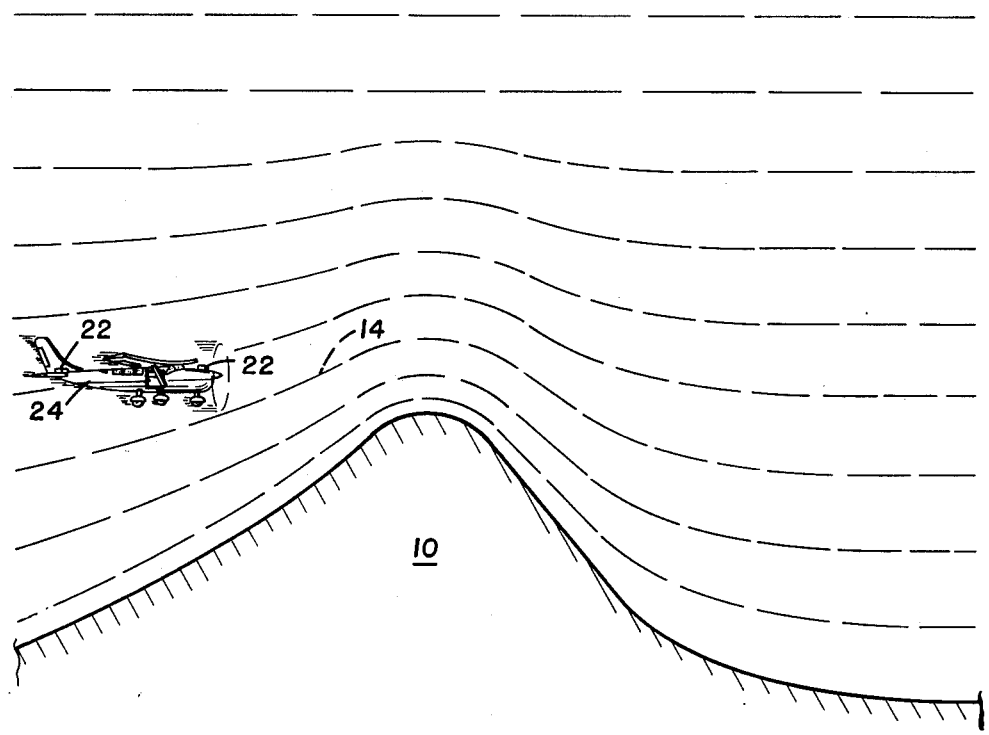
FIG. 3 is a schematic view illustrating the method of the invention relative to the use thereof for airborne objects approaching a mountain.

Referring now to FIGS. 3, 4, and 5, description can be made of the manner by which the operator of the aircraft 24 (instrumented according to FIG. 2) can control said aircraft to avoid terrain obstacles. As seen first in FIG. 3, the aircraft 24 is flying directly toward the mountain 10. According to the description of the electrostatic field made relative to FIG. 1, it is to be recalled that said field exhibits a purely vertical gradient over "level" terrain and at sufficient spatial separations above the mountain 10. Thus, the field E essentially has only a vertical component at such locations. At those locations on the approach path of the aircraft 24 where the equipotential lines 14 are not distorted by the mountain 10, the two probes 22 comprising the "pitch" static voltmeter sense equal potentials. Thus, the display meter 32 gives a "zero" reading. However, as the aircraft 24 moves closer to the mountain 10 and encounters the distorted equipotential surfaces caused by said mountain, the forward probe 22 nearer the forward end of the aircraft begins to read a higher potential than does the probe 22 nearer the aft end of the aircraft. As long as the aircraft 24 is caused to fly "level" (or a calibrated "level") relative to the artificial horizon determined by the gyroscope 34, the operator of the aircraft can be assured that the measured potential difference being read on the meter 32 is due to a change in the horizontal component of the field as seen in FIG. 1, the horizontal component increases from essentially zero over level terrain to an actual value dependent on the slope of the mountain 10. The probes 22 disposed along the "pitch" axis of the aircraft 34 thus read different potentials due to the horizontal component of the field rather than to the vertical component, as long as the attitude of the aircraft is ascertained to be level with respect to the nominal horizontal surface of the earth and as long as any out of plane positioning of the probes 22 is compensated for.

The output of the amplifier 28 as read on the meter 32 of FIG. 2 as the aircraft 24 of FIG. 3 follows a flight path over and above the mountain 10 can be seen in FIG. 4. The output signals of the amplifier 28 are plotted on the graph of FIG. 4 as potential readings at consecutive positions as the aircraft 24 traverses the mountain 10, the aircraft 24 maintaining a "level" flight attitude. On the graph of FIG. 4, potential readings on the curve 40 are plotted relative to the ordinate while position information is plotted relative to the abscissa. The vertical ordinate axis 42 is positioned on the graph relative to the horizontal abscissa axis 44 at the geometrical "summit" of the mountain 10. Thus, the zero potential reading at the intersection of the axes 42 and 44 is noted to correspond to the position of the aircraft 24 directly above the summit of the mountain 10. On approach of the aircraft 24 to the mountain, the "negative" horizontal potential component increases, indicating a higher potential reading at the forwardmost probe 22. As the aircraft 24 passes over the summit of the mountain 10, the potential "reverses" and assumes a maximum "positive" reading, the "positive" potential readings decreasing as the aircraft 24 moves away from the mountain.

Effectively, the information, in the graph of FIG. 4 and in the subjective vector study of FIG. 1 indicates that the horizontal component of the electric field increases from a null value over level terrain to maximum values occurring on either side of the mountain 10, the maximum values being dependent on the slope of the mountain on either side of the summit. Although not shown by the graph of FIG. 4, the vertical component of the electric field, which vertical component is generally useful for stabilization of the attitude of an aircraft by providing a horizontal reference, decreases as the horizontal component increases. At and near the summit of the mountain 10, the vertical component increases dramatically at the same time that the horizontal component undergoes the "reversal" described above; the vertical component then decreases rapidly as the "reversed" horizontal component regains a maximum absolute value as the aircraft 24 moves away from the summit of the mountain. As the horizontal component decreases in value to zero with movement of the aircraft away from the mountain, the vertical component again increases to its eventual full "level terrain" value.

For mountains of the class typically occurring in the eastern portion of the United States, certain values of the horizontal and vertical components of the static electric field can be given as illustrative. Taking the nominal electric field gradient to have a value of 100 volts per meter, the value of the horizontal component of the field is on the order of 33 volts/meter at a distance of 200 meters from the ridge of the mountain and at an altitude of 350 meters above sea level. 1000 meters from the ridge and at an altitude of 275 meters above sea level (110 meters above the ground), the horizontal component is about 5 volts/meter. Thus, the horizontal component of the field at a range of five times the mountain height is typically 5 volts/meter for an altitude of approximately one-half the height of the mountain. If the height of such a mountain were increased, with geometrical similarity preserved, then the shape of the equipotential surfaces about the mountain would remain essentially unchanged. However, the value in volts for such corresponding surfaces would not proportionally increase for a point of geometric similarity if the unperturbed field strength remains constant.

Referring now to FIG. 5, the aircraft 24 can be seen to be on a flight path which is parallel to the longitudinal ridge of the mountain 10. Probes 22 lying on the wingtips (or along a line effectively parallel thereto) are connected as aforesaid to the amplifier 26 to form a "roll" differential voltmeter. When the aircraft 24 is operating as shown in FIG. 5, the probe 22 nearest the mountain 10 will measure a potential higher than the potential measured by the probe 22 on the other wing. Thus, when the attitude of the aircraft 24 is known to be level with respect to an artificial horizon, such as is provided by the gyroscope 34, then the differential potential displayed on the visual display meter 30 is taken by the operator of the aircraft 24 to indicate the presence of an upward terrain slope to the side of the aircraft from which the lower potential reading originates. The operator of the aircraft 24 can then take steps to avoid the mountain 10 or can position the aircraft 24 to fly at a certain disposition relative to the mountain 10. In this situation, as in the situation described relative to FIG. 3, the probes 22 measure differences between the horizontal components of the electric field. When the aircraft 24 is flying level relative to an artificial horizon, the difference in the vertical component of the field between the probes 22 on the wingtips of the aircraft is zero. Measurement of a potential difference between the probes 22 under such circumstances thereby indicates differences in the horizontal component of the field, such differences providing a usual indication of the presence of a terrain feature.

Figure 6:
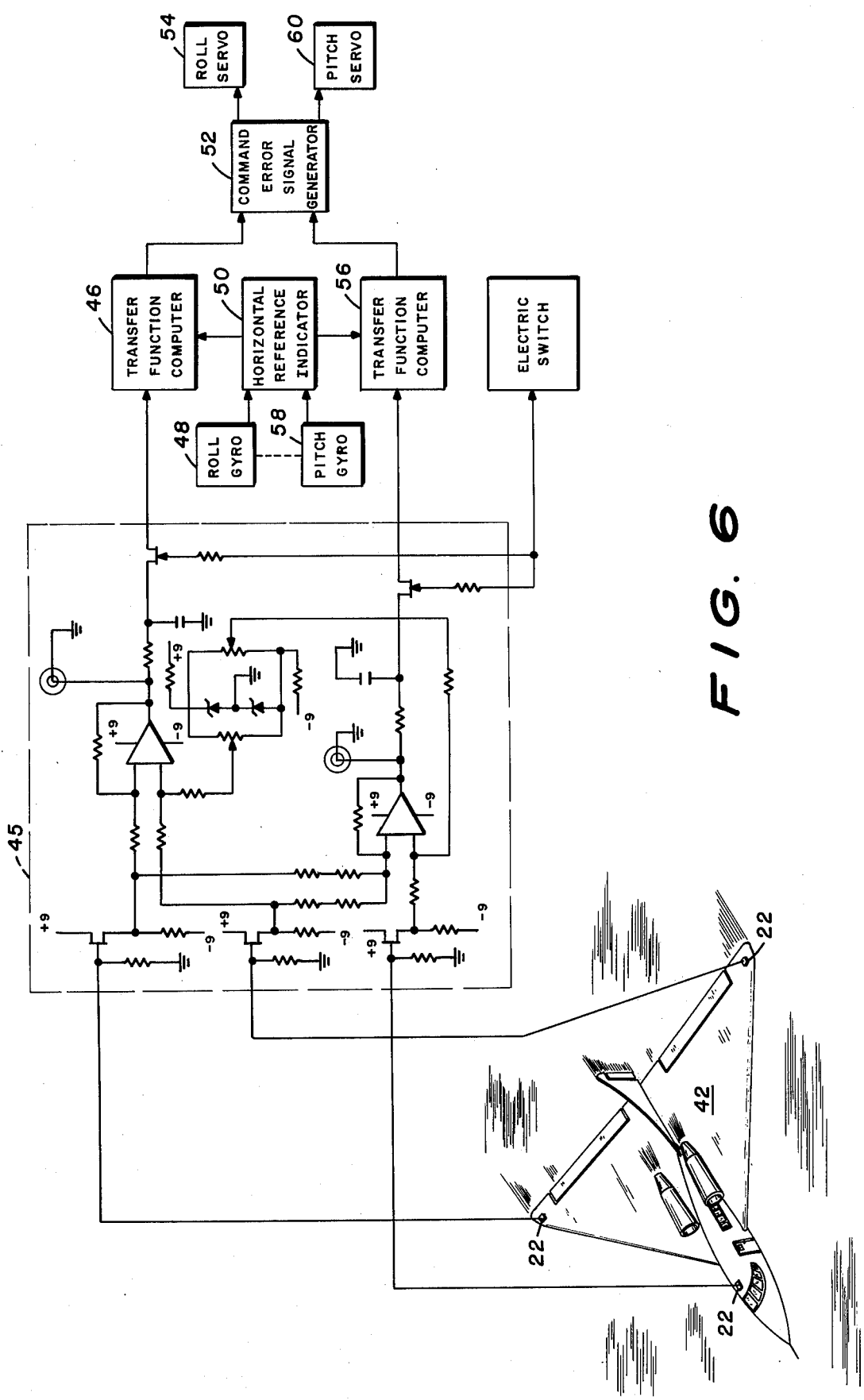

The outputs of the amplifiers 26, 28 and of the gyroscope 34 can be used to inform servomechanical apparatus of the magnitude of direction of potential disturbances resulting from terrain features so that an aircraft can be automatically caused to avoid such terrain features. Referring now to FIG. 6, three probes 22 are disposed on an aircraft 45, the aircraft incidentally being of a Delta-wing configuration. Two of the probes 22 are disposed along a line toward the rear of the aircraft 22, the third probe 22 being located on the forward portion of the aircraft. The forward probe 22 need not lie in the same horizontal plane as do the other two probes 22 since the differential voltage amplifiers may be adjusted to a zero static voltage reading such that all of the probes 22 need not lie in the same plane. The two rearwardly disposed probes 22 form the roll voltmeter and the forwardly disposed probe 22 is referenced to the "electrical center" of the rear probes 22 to provide the pitch voltmeter. Essentially, the rear probes 22 combine with a differential voltage amplifier to feed an output signal to a roll servomechanical apparatus 54. Since the sum of the voltages sensed by the rear probes 22 with respect to the center point is essentially zero as a function of pitch, the forward probe 22 is referenced to this voltage. In essence, the forward probe 22 is referenced to the electrical center of the rear probes 22, the rear probes 22 functioning as the equivalent of an extra probe 22. In this fashion, an output signal is obtained and is fed to a pitch servomechanical apparatus 60 in order to maintain a desired pitch orientation.

The probes 22 on the wingtips of the aircraft 42 produce a differential potential signal through a two-function differential amplifier 45 which is fed into a transfer function computer 46 of conventional design which compares the signal to a horizontal reference signal fed into said computer 46 from a roll gyroscope 48 through a horizontal reference indicator 50. The roll gyroscope 48 preferably comprises one portion of a vertical reference gyroscope, such as the gyroscope 34 of FIG. 2. The roll gyroscope 48 feeds a signal proportional to the attitude of the aircraft 42 relative to an artificial "roll horizon" to the indicator 50, the indicator 50 providing a "computed level" of the aircraft 42 to the transfer function computer 46. The compared output signal of the transfer function computer is fed to a command error signal generator 52 which produces a first output signal proportional to the difference between the artificial horizon gyroscope and the static amplifier 45. This first output signal from the generator 52 is fed to the servomechanical apparatus 54 which operates the roll control surfaces of the aircraft 42. The control surfaces are thereby deflected in a direction to cause the aircraft to maneuver to align said aircraft within the equipotential plane. In a similar fashion, a potential difference between the probe 22 near the forward portion of the aircraft 42 and the probe pair of the wingtips thereof is fed through the amplifier 45 to a second transfer function computer 56, the computer 56 also receiving a signal from the horizontal reference indicator 50 which is dependent on the output of a pitch gyroscope 58 (which preferably comprises a portion of the aforesaid vertical reference gyroscope 34). The pitch gyroscope provides a signal through the indicator 50 which is proportional to the attitude of the aircraft 42 relative to an artificial "pitch horizon". The indicator 50 provides a "computed level" signal to the computer 56. The computer 56 then provides a compared output signal to the command error signal generator 52, the output signal of the generator 52 being fed to the servomechanical apparatus 60 which operates the pitch control surfaces of the aircraft 42.

The aircraft 42 is thereby automatically caused to avoid terrain features which distort the equipotential surfaces existing in the atmosphere. With an airborne vehicle configured as shown in FIG. 6, an aircraft can be made to fly over and around mountains and other orographic protrusions. without pilot input. Alternately, the invention can be practiced as described relative to FIG. 2 inter alia to provide reference indications which a pilot can use to exert appropriate control over the control surfaces of an aircraft.

Use of the invention requires provision for signal gain adjustment at altitudes greater than a few thousand feet. For example, the amplitude of the signals obtained from the amplifiers at 10,000 feet above the earth's surface is decreased five-fold relative to signal amplitude at an altitude of 3,000 feet. This decrease in signal strength occurs due to the change in the static potential gradient with respect to altitude, the static potential gradient at sea level typically being about 180 volts/meter and as low as 10 to 20 volts/meter at an altitude of 20,000 feet. Thus, signal adjustment in the form of gain control is necessary to compensate for the decreased magnitude of the static voltage gradient at relatively high altitudes. Gain control may be provided in a number of well-known ways, such as that shown by Hill in the patent identified hereinabove. The invention may be practiced in a variety of ways, such as by the addition of gain control apparatus, without departing from the scope of the invention as defined by the appended claims.

What is claimed is:

1. A method for detecting the presence of an orographic protrusion extending from the surface of the earth, comprising the steps of:

locating at least two spaced points in the earth's atmosphere which lie along a line parallel to the nominal surface of the earth;

sensing the horizontal potential component of the electrostatic field existing in the earth's atmosphere at each of the two spaced points; and, comparing the two sensed horizontal potential components, a difference in potential therebetween indicating the presence of an orographic protrusion extending from the surface of the earth.

2. The method of claim 1 and further comprising the steps of:

adjusting the attitude of the line joining the two points to cause the difference in potential between the two sensed horizontal potential components to be zero.

3. The method of claim 1 wherein the step of sensing the horizontal potential components at the two spaced points includes the step of:

sensing said electrostatic field with probe means responsive to the relative magnitude of the electrostatic field at the two spaced points.

4. A method for detecting the presence of an orographic protrusion extending from the surface of the earth, comprising the steps of:

locating at least two spaced points in the earth's atmosphere which lie along a line parallel to the nominal surface of the earth;

sensing the horizontal potential component of the electrostatic field existing in the earth's atmosphere at each of the two spaced points; and, comparing the two sensed horizontal potential components, a difference in potential therebetween indicating the presence of an orographic protrusion extending from the surface of the earth, wherein the step of locating the two spaced points includes the step of defining an artificial horizontal plane in the earth's atmosphere, the line joining the two spaced points being parallel to said plane.

5. A method for detecting the attitude relative to an orographic protrusion extending from the surface of the earth of at least one axis of an airborne vehicle operating in the electrostatic field existing in the earth's atmosphere, the protrusion distorting the shape and position of equipotential surfaces in the field which normally are parallel to the nominal surface of the earth, the method comprising the steps of:

defining an artificial horizontal plane in the earth's atmosphere which is parallel to the nominal surface of the earth;

aligning the axis of the airborne vehicle with said defined plane;

sensing the horizontal potential component of the electrostatic field at each of two spaced points, the points lying along the axis of the airborne vehicle; and, generating a potential difference signal proportional to the magnitude of the difference in the two sensed horizontal potential components, the potential difference signal being indicative of misalignment between the axis of the airborne vehicle and the equipotential surfaces surrounding the orographic protrusion.

6. The method of claim 5 and further comprising the step of:

aligning the axis of the airborne vehicle in response to the generated signal with the equipotential surfaces to cause the difference in potential between the two sensed horizontal potential components to be zero.

7. A method for operating an airborne vehicle to cause said vehicle to avoid orographic protrusions extending from the surface of the earth, comprising the steps of:

defining an artificial horizontal plane;

sensing the horizontal potential component of the electrostatic field existing in the earth's atmosphere at each of at least two spaced points effectively on the airborne vehicle, the spaced points effectively lying in the artificial horizontal plane;

generating a potential difference signal proportional to the magnitude of the difference in the two sensed potential components; and, displacing the position of at least one of the points to cause the potential difference signal to become zero.

8. The method of claim 7 wherein the two spaced points lie along the longitudinal axis of the airborne vehicle.

9. The method of claim 7 wherein the two spaced points lie along the transverse axis of the airborne vehicle.

10. Apparatus for operating an airborne vehicle in the earth's atmosphere to cause said vehicle to avoid orographic protrusions extending from the surface of the earth comprising:

at least two electrostatic potential sensing probes disposed on the airborne vehicle;

means electrically connected to the probes for receiving the horizontal potential components of the electrostatic field sensed by said probes and for producing a first output signal proportional to the difference in the sensed components;

means for effectively referencing the attitude of the airborne vehicle to an artificial horizon and for producing a second output signal proportional thereto;

means for referencing the first output signal of the first mentioned means to the second output signal and for producing a third output signal indicative of the attitude of the vehicle with respect to the artificial horizon and of the difference in the horizontal potential components between the two probes; and, means for adjusting the attitude of the airborne vehicle relative to the surface of the earth in response to the third output signal.

11. The apparatus of claim 10 wherein the two probes lie along an axis of the airborne vehicle and wherein the last-mentioned means angularly displaces at least one of the probes to cause the first output signal to become zero.

* * * * *